United States Patent
Andre et al.

(10) Patent No.: US 12,254,142 B2
(45) Date of Patent: Mar. 18, 2025

(54) VARIABLE FRICTION AND MULTI-TEXTURE MOUSE

(71) Applicant: Apple Inc., Cupertino, CA (US)

(72) Inventors: Bart K. Andre, Palo Alto, CA (US); Brian T. Gleeson, Mountain View, CA (US); Kristi E. Bauerly, Los Altos, CA (US); William D. Lindmeier, San Francisco, CA (US); Matthew J. Sundstrom, Campbell, CA (US); Geng Luo, Santa Clara, CA (US); Seung Wook Kim, San Jose, CA (US); Evangelos Christodoulou, Santa Clara, CA (US); Megan M. Sapp, San Francisco, CA (US); Kainoa Kwon-Perez, San Francisco, CA (US); John B. Morrell, Los Gatos, CA (US); John S. Camp, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/472,186

(22) Filed: Sep. 21, 2023

(65) Prior Publication Data
US 2024/0094832 A1  Mar. 21, 2024

Related U.S. Application Data

(60) Provisional application No. 63/478,523, filed on Jan. 5, 2023, provisional application No. 63/376,767, filed
(Continued)

(51) Int. Cl.
*G06F 3/0354* (2013.01)
*G01P 13/00* (2006.01)
(Continued)

(52) U.S. Cl.
CPC .......... *G06F 3/03543* (2013.01); *G01P 13/00* (2013.01); *G01S 5/30* (2013.01);
(Continued)

(58) Field of Classification Search
CPC .... G06F 3/03543; G06F 3/016; G06F 3/0346; G06F 3/03544; G06F 3/03547;
(Continued)

(56) References Cited

U.S. PATENT DOCUMENTS 6,844,871 B1    1/2005   Hinckley et al.
2008/0150895 A1    6/2008   Yu et al.
(Continued)

OTHER PUBLICATIONS

PCT International Search Report and Written Opinion for PCT International Application No. PCT/US2023/074961, mailed Nov. 24, 2023, 16 pp.

*Primary Examiner* — Brent D Castiaux
(74) *Attorney, Agent, or Firm* — Dorsey & Whitney LLP (57) ABSTRACT

An input device can include a housing defining an internal volume and a lower portion, the lower portion defining an aperture, an input sensor disposed in the internal volume, and a haptic assembly disposed in the internal volume. The haptic assembly can include an actuator and a foot coupled to the actuator and aligned with the aperture. The actuator can be configured to selectively extend the foot through the aperture to vary a sliding resistance of the input device on a support surface.

18 Claims, 6 Drawing Sheets

Related U.S. Application Data on Sep. 22, 2022, provisional application No. 63/376,650, filed on Sep. 22, 2022, provisional application No. 63/376,756, filed on Sep. 22, 2022, provisional application No. 63/376,763, filed on Sep. 22, 2022.

(51) Int. Cl.
*G01S 5/30* (2006.01)
*G06F 3/01* (2006.01)
*G06F 3/0346* (2013.01)
*G06F 3/038* (2013.01)
*G06F 3/044* (2006.01)
*G06F 3/04815* (2022.01)

(52) U.S. Cl.
CPC ............ *G06F 3/016* (2013.01); *G06F 3/0346* (2013.01); *G06F 3/03544* (2013.01); *G06F 3/03547* (2013.01); *G06F 3/0383* (2013.01); *G06F 3/044* (2013.01); *G06F 3/04815* (2013.01); *G06F 2203/0337* (2013.01); *G06F 2203/0381* (2013.01); *G06F 2203/04104* (2013.01)

(58) Field of Classification Search
CPC .... G06F 3/0383; G06F 3/044; G06F 3/04815; G06F 3/017; G06F 3/043; G06F 2203/0381; G06F 2203/04104; G06F 2203/0337; G01P 13/00; G01S 5/30
See application file for complete search history.

(56) References Cited

U.S. PATENT DOCUMENTS

| | | |
|---|---|---|
| 2010/0039381 A1 | 2/2010 | Cretella et al. |
| 2012/0105207 A1 | 5/2012 | Trabucco et al. |
| 2015/0212598 A1 | 7/2015 | Lee |
| 2017/0249024 A1* | 8/2017 | Jackson .............. G06F 3/03543 |
| 2018/0267609 A1 | 9/2018 | Strese et al. |
| 2019/0155477 A1* | 5/2019 | Busby ................ G06F 3/03543 |
| 2019/0171302 A1 | 6/2019 | Su et al. |

* cited by examiner

VARIABLE FRICTION AND MULTI-TEXTURE MOUSE

CROSS-REFERENCE TO RELATED APPLICATION(S)

This claims priority to U.S. Provisional Patent Application No. 63/478,523, filed 5 Jan. 2023, and entitled "Input Device," to U.S. Provisional Patent Application No. 63/376,767, filed 22 Sep. 2022, and entitled "Variable Friction and Multi-Texture Mouse," to U.S. Provisional Patent Application No. 63/376,763, filed 22 Sep. 2022, and entitled "Multi-Mode Mouse," to U.S. Provisional Patent Application No. 63/376,650, filed 22 Sep. 2022, and entitled "Input Device for Three-Dimensional Control," and to U.S. Provisional Patent Application No. 63/376,756, filed 22 Sep. 2022, and entitled "Input Device with Adaptive Grip Orientation," the entire disclosures of which are hereby incorporated by reference in their entirety.

FIELD

The present disclosure relates generally to electronic input devices. More particularly, the present disclosure relates to electronic input device feedback modes and variations thereof.

BACKGROUND

Recent advances in computing have enabled immersive user experiences including desktop gaming on personal computers, alternate and virtual reality interactive consoles, three-dimensional computer-aided design software, high-resolution display screens, and so forth. However, the user feedback provided by these computing systems and software is often limited to audio and visual feedback. Even portions of computing devices and systems that user's physically interact with, such as game controllers, keyboards, mice, and other physical input devices, are limited to elementary tactile user feedback, for example from haptic engine vibrations. Desktop and laptop computers, commonly used at home and office settings, utilize input devices such as pens, styluses, and mice to enable user input. However, a typical computer mouse or stylus is likewise limited in user feedback capabilities.

Therefore, what is needed in the art are input devices and systems capable of producing enhanced user feedback for more immersive user computing experiences.

SUMMARY

In at least one example of the present disclosure, an input device can include a housing defining an internal volume and a lower portion, the lower portion defining an aperture, an input sensor disposed in the internal volume, and a haptic assembly disposed in the internal volume. The haptic assembly can include an actuator and a foot coupled to the actuator and aligned with the aperture. The actuator can be configured to selectively extend the foot through the aperture to vary a sliding resistance of the input device on a support surface.

In one example, the input sensor includes a plurality of capacitive sensing elements disposed on the housing and the foot is movable, via the actuator, between a first position and a second position, wherein in the second position the foot extends through the aperture. In one example, a first coefficient of friction between the lower portion and a support surface on which the input device rests with the foot in the first position is different than a second coefficient of friction between the foot and the support surface with the foot in the second position. In one example, the actuator is coupled to the foot to selectively extend the foot through the aperture. In one example, the lower portion includes a support protrusion having a lower surface. In one example, the lower portion defines a lower surface configured to support the input device on a support surface. In one example, the actuator is configured to extend the foot through the aperture such that a contact surface of the foot supports the input device on the support surface. In one example, the actuator is configured to extend the foot through the aperture such that a contact surface of the foot supports the input device on the support surface. In one example, a frictional force between the input device and the support surface on which the input device rests changes when the contact surface of the foot supports the input device. In one example, the foot is a first foot, the aperture is a first aperture, the housing defines a second aperture, and the mouse comprises a second foot extendable through the second aperture.

In at least one example of the present disclosure, a mouse includes a housing defining an aperture and a lower surface, and a foot movable between a first position and a second position. In such an example, in the first position, the lower surface defines a bottom-most surface of the mouse and in the second position, the foot extends through the aperture and defines a bottom-most surface of the mouse.

In one example, the bottom-most surface is configured to contact a support surface on which the mouse rests while the foot is in the first position or while the foot is in the second position. In one example, the mouse further includes an actuator coupled to the foot, the actuator configured to selectively extend the foot through the aperture. In one example, a sliding resistance between the contact surface and a support surface on which the mouse rests changes based on whether the foot is in the first position or the foot is in the second position. In one example, the actuator includes a motor. In one example, the aperture is a first aperture, the housing defines a second aperture, the foot is a first foot, the input device further includes a second foot, and the second position further includes the second foot extending through the second aperture.

In at least one example of the present disclosure, an input device includes a first condition having a first sliding resistance on a surface, a second condition having a second sliding resistance on the surface, the second sliding resistance being different than the first sliding resistance, and an actuator to selectively switch the input device from the first condition to the second condition. The input device can also include an input sensor to detect input from a hand of a user grasping the input device.

In one example, the actuator is a motorized actuator operable to extend a foot relative to a bottom surface of the input device. In one example, the actuator is configured to selectively switch between the first condition and the second condition according to a texture pattern. In one example, in the first condition, the input device includes a lower portion defining a first lower contact surface and an aperture and in the second condition, the input device includes a foot extending through the aperture and defining a second lower contact surface separate from the first lower contact surface. In one example, the actuator selectively switches the input device from the first condition to the second condition by extending the foot through the aperture. In one example, the input device can further include a processor programmed to control the actuator to extend the foot through the aperture based on a location of a cursor controlled by the input device on a display screen.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates generally to electronic input devices. More particularly, the present disclosure relates to electronic input device feedback modes and variations thereof. User feedback provided by typical computing systems and software is often limited to audio and visual feedback. Even portions of computing devices and systems that user's physically interact with, such as game controllers, keyboards, mice, and other physical input devices, are limited to elementary tactile user feedback, for example from haptic engine vibrations. Desktop and laptop computers, commonly used at home and office settings, utilize input devices such as pens, styluses, and mice to enable user input. However, a typical computer mouse or stylus is likewise limited in user feedback capabilities.

User input devices and systems described herein provide enhanced feedback to users controlling or manipulating images presented on a display screen beyond user input devices of the prior art. In at least one example, an input device includes a housing defining an internal volume and a lower portion, the lower portion defining an aperture, and a haptic assembly disposed in the internal volume. The haptic assembly can include an actuator and a foot coupled to the actuator and aligned with the aperture. In at least one example, the actuator can selectively extend the foot through the aperture. When the foot is extended through the aperture, the lower surface of the foot becomes the contact surface between the input device and a support surface, such as a desktop surface, rather than the lower portion of the input device being the contact surface. That is, in at least one example, the portion of the input device contacting the desktop surface can be changed during use.

Further, because the lower surface of the foot and the lower portion of the input device can have different properties, for example different coefficients of friction or support contact surface areas, the force required to move the input device along the desktop surface can vary as the foot extends through the aperture. For example, the lower surface of the foot can include a material with a higher coefficient of friction than the lower portion defining the aperture. The force required to slide the input device along a surface also depends on other factors, including contact surface area and downward force (normal force) applied to the input device. However, all else being equal, in such a scenario where the coefficient of friction of the foot is greater than that of the lower portion of the device, extending the foot through the aperture such that the contact surface between the input device and the desktop surface is the lower surface of the foot, the friction between the input device and the desktop surface can be increased. Thus, the force or torque required to slide the input device across the desktop surface can be selectively increased or decreased depending on the position of the foot and lower surface of the device relative to the desktop surface.

The converse can also be true, where the lower surface of the foot has a lower coefficient of friction such that actuating the foot to extend through the aperture can decrease the friction between the input device and the desktop surface. Also, other examples can include multiple feet selectively extending through multiple apertures defined by the lower portion of the input device such that the total surface area of the lower surfaces of the various feet are less than, greater than, or equal to the surface area of the lower portion of the device. Along these lines, examples including multiple feet can actuate individual feet separately or together to produce the desired frictional forces or torques resisting the input device being pushed or rotated across the surface.

As used herein, the term "selectively," when used to describe the feet selectively extending through apertures or actuators selectively extending feet through apertures, is used to describe an operational mode where one or more feet of an input device can either be extended through or not extended through an aperture at any point in time during operation and where any foot can be changed from an extended position to a non-extended position at any point in time during operation. The selective extension of feet through apertures of input devices described herein can be done automatically via a processor of the computing device and/or the input device such that the change in friction between the input device and a support surface due to the selective extension of feet corresponds to a position of a cursor or visual object on a display screen.

In one example, the friction between the input device and a support surface on which the input device is moved, such as a desktop surface, can be automatically altered to mimic a surface texture or environment, or change thereof, over which the cursor controlled by the input device is moved on a display screen. One scenario could include one portion of a display screen visually representing ice and another portion of the display screen visually representing sand. As a visual object (e.g., cursor) controlled by the input device is moved over the ice portion, the input device can maintain a first friction between the input device and the desktop. Then, as the visual object (e.g., cursor) controlled by the input device is moved over the sand portion of the screen, the input device can increase the friction between the input device and the desktop surface, via selective actuation of the feet, to mimic the increased forces it would take in reality to move such an input device over sand compared to ice.

Other examples could include moving a game character through water and air, in which the input device could impart different tactile feedback to the user via variable friction. In some examples, different surface textures and features can be communicated tactilely back to the user by corresponding the timing of one or more feet increasing (or decreasing) the frictional force required to move the input device to the position, shape, and size of the surface features as the cursor or other object is moved across a screen. For example, moving a cursor over a visual representation of a "diamond plate" sheet metal could cause feet to extend from the aperture of the input device each time the cursor moves across an individual diamond protrusion. In such a scenario, as the user slides the input device across the desktop, the user can tactilely feel a simulated "bump" as if the input device is being moved over the diamond plate sheet metal even when the desktop surface is smooth. The feet can be intermittently actuated at any rate depending on the position and spacing of the diamond features and depending on how fast the user moves the cursor over the diamond pattern.

One will appreciate that the mimicking of surface features such as those found on diamond plate sheet metals can be applied to any other surface features shown on a display screen or in a virtual/augmented reality system. These can include various surface textures, shapes, bumps, protrusions, objects, and so forth. Creating this tactile feedback mimicking on-screen features can provide a more immersive, realistic sensory feedback environment to the user for any number of applications, including those mentioned above and discussed elsewhere herein. The applications can include three-dimensional (3D) design, gaming, web-browsing, or any other visual display software application.

In addition to examples noted above where devices can mimic textures and vary friction while sliding across a support surface, in some examples, the friction or sliding resistance of devices described herein can be altered to maintain constant friction over different support surfaces. Typically, as an input device such as a computer mouse is slid by a user over a mouse-pad, and then off the mouse pad onto the desktop surface surrounding the mouse pad, the user experiences different sliding resistance based on a difference in the materials of the mouse pad and the desktop surface. Device described herein, utilizing selectively articulated feet as noted above, can alter the lower contact surface of the mouse to maintain a constant friction as the user moves the mouse from one surface to another.

In the example given, the material of the mouse pad may have a higher coefficient of friction with the lower surface of the mouse than a finished wood surface of the desktop. In such a situation, the devices and systems described herein can alter the coefficient of friction between the two materials by selectively actuating feet as described herein such that the coefficient of friction between the lower contact surface of the mouse and both the mouse pad and the desktop surface remains the same. In this way, the user can feel no difference in the sliding resistance of the mouse regardless of the surface over which the mouse is sliding. The can be done automatically to provide the user with a smooth, comfortable experience manipulating the mouse.

Accordingly, examples of input devices disclosed herein can create tactile feedback mimicking on-screen features to provide a more immersive, realistic sensory feedback experience for the user while interacting with any number of applications that include a manual input device. These applications can include those mentioned above and discussed elsewhere herein, including 3D design, gaming, web-browsing, or any other visual display and/or interactive software application.

These and other embodiments are discussed below with reference to FIGS. 1-7. However, those skilled in the art will readily appreciate that the detailed description given herein with respect to these figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Figure 1:
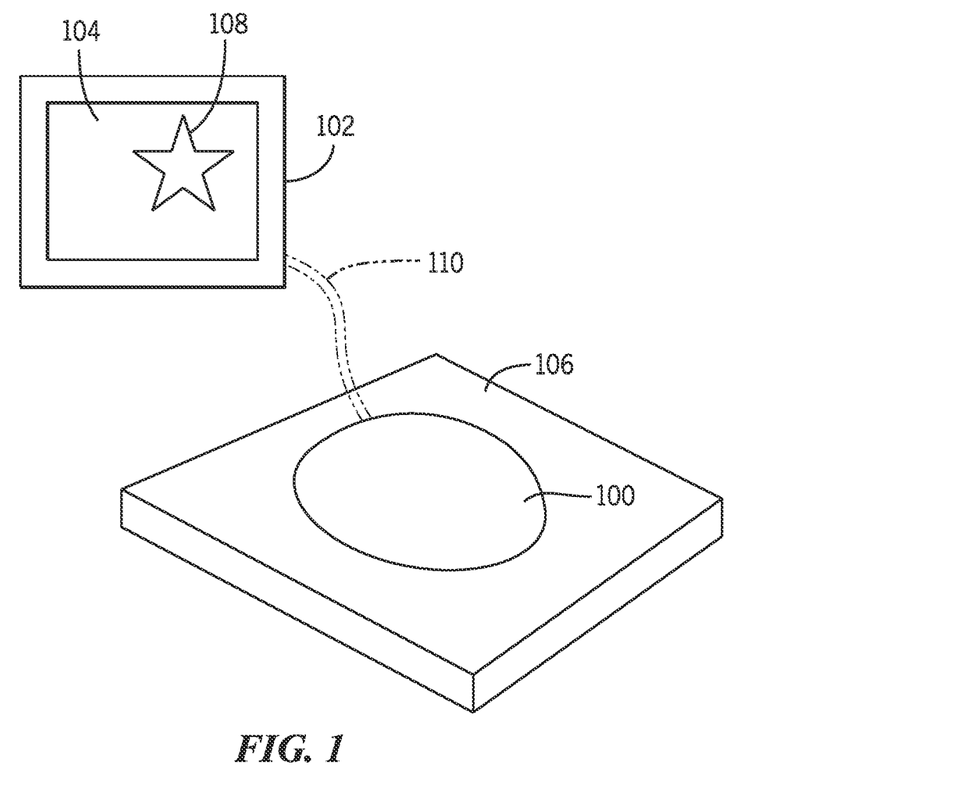
FIG. 1 shows an example of an input device controlling a visual object on a display screen.

FIG. 1 illustrates an example of an input device 100 resting on support surface 106. The input device 100 can be configured to manipulate a visual object 108 displayed on a display screen 104 of a display device 102. The display device 102 can include a computing device such as a desktop, laptop, or tablet computer. An electrical connection 110 between the input device 100 and the display device 102 is illustrated in dotted lines because implementations of the device 100 can either be hardwired to the display device 102 or the input device 100 can wirelessly connect with the display device 102 to visually manipulate visual object 108 on the display screen 104.

The display device 102 can be a computing device configured to run software applications that display visual information to the user. The visual object 108 shown in FIG. 1 is a non-limiting example of an image whose movement on the display screen 104 can be controlled to correlate to a movement of the input device 100 on the support surface 106. The visual object 108 can be a cursor in some examples. In other examples, the visual object 108 can include a gaming character or a three-dimensional part being designed in computer-assisted design (CAD) software. As the user moves input device 100 across the support surface 106 on which the input device 100 rests, the visual object 108 can move across the display screen 104 in like manner.

The support surface 106 can include any surface on which the input device 100 can rest and be slid during use. In one example, the support surface 106 includes a top surface of a mousepad. In another example, the support surface 106 can include the top surface of a desk, counter, or table, including various materials.

In at least one example, the visual object 108 can be superimposed over one or more background images on the display screen 104. The input device 100 can be configured to move the visual object 108 over the top of the background images, which may include one or more different surface structures, features, or textures. The visual object 108 can be translated over these features or textures as the visual object 108 is moved virtually on the display screen 104. The devices described herein, including the input device 100 shown in FIG. 1, can provide tactile feedback to the user, as the user's hand slides the input device 100 over the support surface 106, to physically mimic what it would feel like as a visual object 108 is translated across the display screen 104 in reality.

Any of the features, components, and/or parts, including the arrangements and configurations thereof shown in FIG. 1 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 1.

Figure 2A:
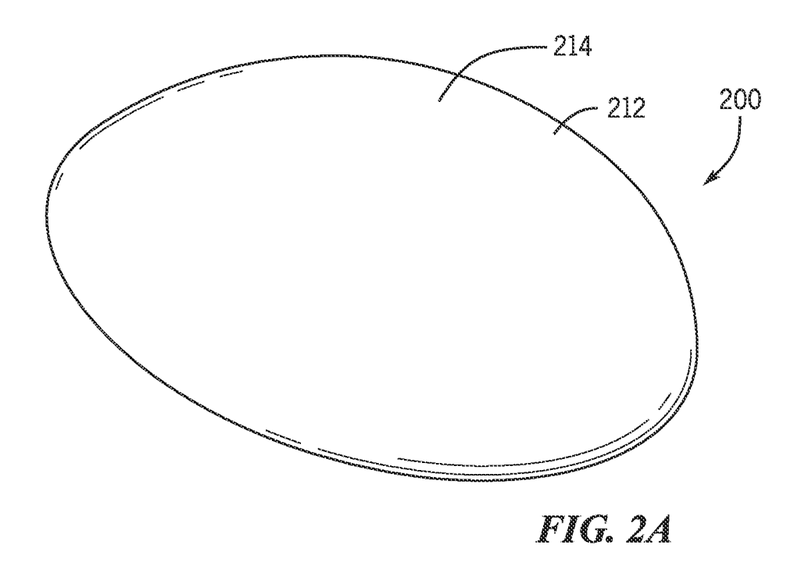
FIG. 2A shows a top, perspective view of an example of an input device.
Figure 2B:
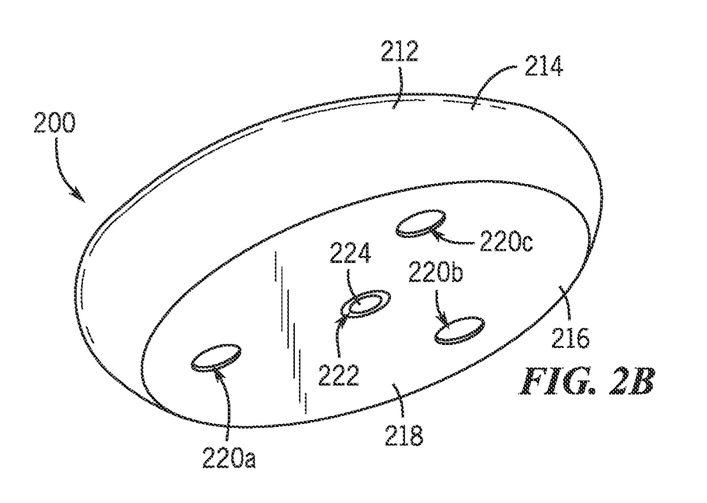
FIG. 2B shows a bottom, perspective view thereof.

FIGS. 2A and 2B illustrate upper and lower perspective views, respectively, of an example of an input device 200 including a housing 212 defining a grip portion 214 and a lower portion 216. The grip portion 214 can be curved, non-planer, or otherwise shaped to accommodate gripping of the input device 200 by the user. In at least one example, the lower portion 216 can be a planar, flat portion defining a lower contact surface 218. The lower contact surface 218 can also be referred to as a lower surface or a contact surface. The lower surface 218 is configured to contact a support surface on which the input device 200 rests and across which the user may slide the input device 200 during use. The grip portion 214 and the lower portion 216 of the housing 212 can vary in shape, size, and configuration in one or more other examples. The illustrated in the device 200 of FIGS. 2A and 2B are illustrative only and not meant to be limiting.

In at least one example, as shown in FIG. 2B, the lower portion 216 of the input device 200 can define one or more apertures 220a, 220b, and 220c. The apertures 220a-c can be referred to collectively as apertures 220. The apertures 220 defined by the lower portion 216 can form through-holes extending through an entire thickness of the housing 212 of the lower portion 216. In addition to these apertures 220, the lower portion 216 can define another aperture 222 through which a visual sensor 224 can emit and receive light. The visual sensor 224 2 detect movement and position of the input device 200 on a support surface.

The lower portion 216 defines the lower surface 218 configured to contact a support surface and support a weight of the input device 200. The lower surface 218 contacts a support surface and supports the weight of the input device 200 as well as any weight or force added by the user's hand resting on the input device 200. Accordingly, as the user slides or rotates the input device on a support surface, a sliding resistance, frictional force, or frictional torque acting between the lower surface 218 and the support surface on which the input device 200 rests will resist or redirect such movement.

Any of the features, components, and/or parts, including the arrangements and configurations thereof shown in FIGS. 2A-2B, can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 2A-2B.

Figure 3:
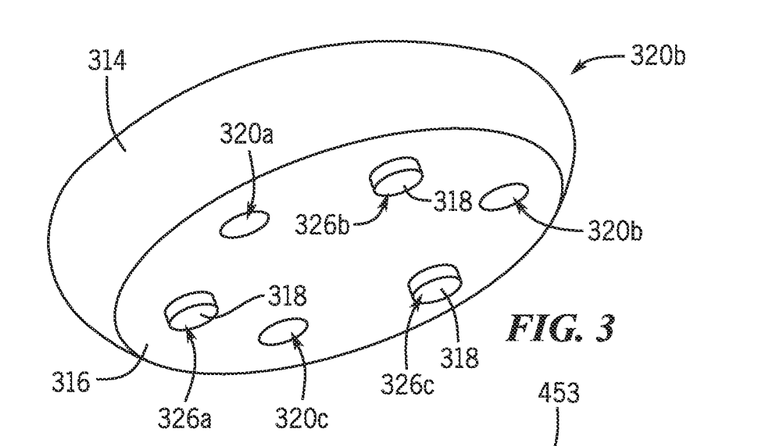
FIG. 3 shows a bottom, perspective view of an example of an input device.

FIG. 3 illustrates a lower perspective view of another example of an input device 300. The input device 300 includes a grip portion 314 and a lower portion 316 defining one or more apertures 320a, 320b, and 320c. In the example illustrated in FIG. 3, the lower portion 316 also includes one or more support protrusions 326a, 326b, and 326c, which can be referred to collectively as the lower support protrusions 326. The lower support protrusions 326 can extend downward from the lower portion 316 to define the lower contact surface 318. Again, the lower contact surface 318 can also be referred to as a contact surface or the lower surface and includes any surface contacting the support surface during use.

In the example shown in FIG. 3, the lower support protrusions 326 define the lower contact surface 318 because the support protrusions 326 extend downward to contact a support surface on which the input device 300 rests and is slid along during use. Thus, as used herein, the term "lower contact surface" or other terms related thereto is used to describe any surface supporting the weight of the input device 300 and any surface configured to contact the support surface during use. Accordingly, one or more other examples of input devices can include other features or portions defining a lower contact surface on which the input device rests. These other features can be similar or different from the lower support protrusions 326 shown in FIG. 3 or the lower portion 216 shown in FIG. 2B.

The total surface area, materials, surface textures, and other surface or material properties of the lower contact surfaces of various input devices described herein can be designed and tuned to achieve a desired frictional force or sliding resistance as a user slides the input device across a support surface during use.

Any of the features, components, and/or parts, including the arrangements and configurations thereof shown in FIG. 3 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 3.

FIGS. 4A-4D illustrate an example of an input device 400 in two different conditions. In each condition, described in more detail below, one or more feet are disposed in different positions relative to the input device 400. Each condition, or each position of feet of the input device 400, provides a unique lower contact surface of the input device 400 which alters the sliding force, frictional force, or frictional torque of the input device 400 as the input device 400 is slid or rotated across a support surface by the user. The one or more feet of the input device 400 can be movable to selectively extend through one or more apertures of the input device 400 and create variable frictional forces, torques, and sliding resistances during use. For example, one foot (or a set of feet) can be extended from the device 400 at an off-center position on the lower surface to cause the user to experience a frictional torque. For example, the foot or feet can extend to increase friction on one side of a bottom centerline of device (e.g., below the user's grip on the device 400). The increased friction can give the user of the device 400 a sensation or bias of rotation in one direction when the user moves the device 400 along an axis or direction that does not intersect the extended foot (i.e., along a direction that does not equally balance the frictional resistance applied by multiple feet that are positioned on each side of the axis of motion).

Figure 4A:
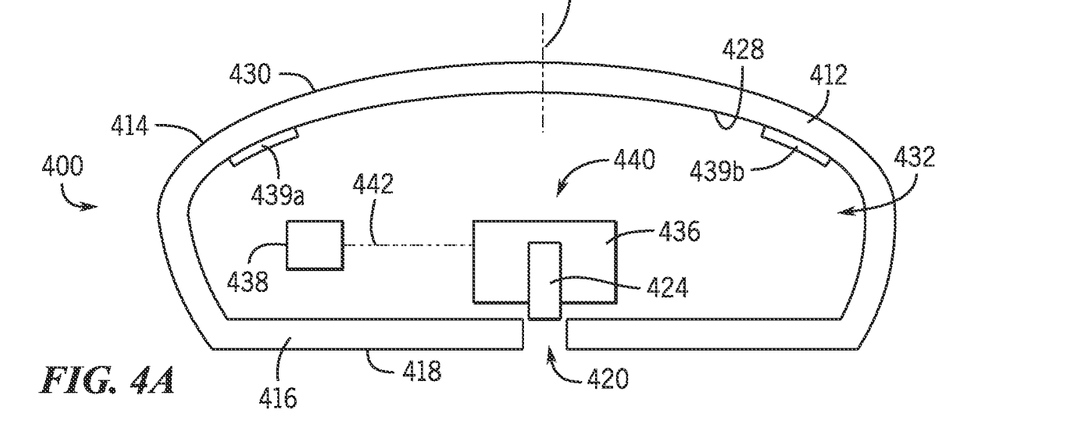
FIG. 4A shows a cross-sectional view of an example of an input device.

FIG. 4A shows a cross-sectional view of the input device 400. In at least one example, the input device 400 can include a housing 412 defining a grip portion 414 and a lower portion 416. The lower portion 416 defines an aperture 420 (e.g., similar to apertures 320a-c) and a lower contact surface 418. The housing 412 also includes or defines a grip portion 414 which the user can grab with his or her hand to manipulate the input device 400 across a support surface. In particular, in the condition of the device 400 shown in FIG. 4A, the lower contact surface 418 defined by the lower portion 416 can support the input device 400 and slide across a support surface. As noted above, a support surface can include any surface on which the input device 400 rests, including desktop surfaces, mouse pads, tabletops, and so forth.

The housing 412 can define an exterior surface 430 and an opposing interior surface 428. In at least one example, the interior surface 428 defines an internal volume 432 of the input device 400. In at least one example, the input device 400 can include one or more input sensors 439a and 439b configured to receive input from the user. In the illustrated example of FIG. 4A, the input device 400 includes two separate touch sensors 439a and 439b disposed against the interior surface 428 of the housing 412. These touch sensors 439a and 439b can include capacitive touch elements configured to sense when and where a user's finger, palm, or other portion of the user's hand contacts the exterior surface 430 of the housing 412. The user can contact the input device 400 at the exterior surface 430 at positions corresponding to the touch sensors 439a and 439b to give commands using touches, taps, squeezes, touch gestures, and so forth.

In at least one example, the input device 400 can include more than the two input sensors 439a and 439b shown in FIG. 4A. Other examples of input devices can also include other types of input sensors and mechanisms, including physical buttons, TAC switches, strain gauges, microphones, or other types of touch sensors or buttons disposed elsewhere within the internal volume 432, on the exterior surface 430, or elsewhere in or on the input device 400. Input signals detected by such sensors, including the input sensors 439a and 439b shown in FIG. 4A, can be relayed, either wirelessly or through one or more hardwired connections between the input device 400 and a computing device, to a computing device to carry out instructions based on those signals. In this way, the input device 400 can be used to control one or more visual objects on a display screen of a computing device as described with reference to FIG. 1 and discussed above.

In at least one example, an array of input sensors, including input sensors 439a and 439b shown in FIG. 4A, can be disposed on or within the input device 400 to detect multiple input signals and touches from the user. These input signals can determine the presence and/or location of finger taps and gestures or hand positions of the user's hand contacting the exterior surface 430 of the input device 400.

Figure 4B:
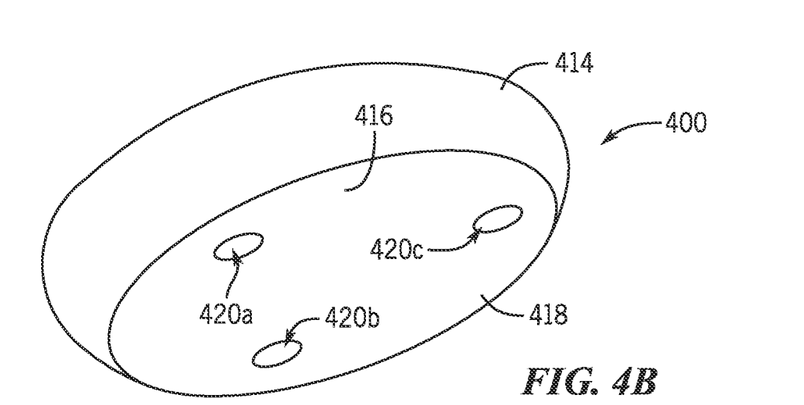
FIG. 4B shows a bottom, perspective view thereof.

At least one example of the input device 400 can include a haptic assembly 440 disposed in the internal volume 432. The haptic assembly 440 can include an actuator 436 and a foot 434 coupled to the actuator and aligned with the aperture 420. The actuator 436 is coupled to the foot 434 in such a way that the actuator 436 is configured to extend the foot between a first position and a second position. The foot in FIG. 4A is shown in a first position wherein the foot does not extend below the lower contact surface 418 of the input device 400. The lower perspective view of the input device 400 shown in FIG. 4B illustrates the input device 400 having multiple apertures 420a, 420b, and 420c defined by the lower portion 416. In this first position of the foot 434, the lower portion 416 defines lower contact surface 418 on which the input device 400 rests and is supported on the support surface.

In at least one example, the actuator 436 includes a motor configured to physically move the foot 434 in and out of the internal volume 432 such that the foot 434 is selectively movable in and out through the aperture 420 defined by the lower portion 416. The input device 400 can also include one or more processors 438 electrically coupled to the actuator 436 of the haptic assembly 440 via one or more wires or circuitry components 442. The processor 438 can be a part of a controller determining when and how the foot 434 is moved in and out of the aperture 420.

It will also be noted that the input device 400 can include one or more other electronic devices or components configured to send one or more signals to and from the actuator 436 and to and from computer electrically coupled with the input device 400. In some examples, the input device 400 does not include the processor 438 but a processor of a computing device determines when and how the actuator 436 moves the foot 434. In such an example, the hardwired or wireless connection and/or antenna of the computing device and/or the input device 400 can be used to send and receive such signals. However, for purposes of explanation and as one example, the input devices described herein, including the input device 400 of FIG. 4A, can include the processor 438 for the purpose of controlling the actuator 436.

In at least one example, the housing 412 is symmetric (e.g., rotationally symmetric) about the central axis 453 oriented generally perpendicular to a surface on which the input device 400 can rest or be manipulated. For example, the housing 412 can be circular with the central axis 453 being a central axis of rotation and/or symmetry of the input device 400. In at least one example, the user can initially grasp the input device 400, including the housing 412 thereof, in any orientation and have the input device 400 be oriented as intended by the user based on the user's grip or hand position regardless of the actual orientation of the input device 400, as described herein. In such an example, the processor 438 can determine the hand position and intended orientation of the input device 400 based on the hand position of the user grasping the housing 412 via the touch sensors 439a-b.

In at least one example, the housing 412 of the input device 400 is circular or domed as shown in FIG. 4A such that the housing 412 can be rotated about the central axis 453 serving as a central axis of rotation of the circular housing 412. In such an example, mouse is agnostic to the actual orientation of the housing 412 relative to a support surface on which the housing 412 rests. Rather, the housing 412 can be oriented and/or re-oriented digitally or computationally by the processor 434 based on the hand position of the user, as detected by the touch sensors 439a-b, without the need to physically move or rotate the input device 400 upon grasping the housing 412.

As noted above, the actuator 436 can be configured to extend the foot 434 through the aperture 420. The actuator 436 can be configured to selectively extend the foot 434 between the first position and a second position in order to change which surface includes the lower contact surface of the input device 400. Again, as shown in FIGS. 4A and 4B, the foot 434 is in a first position including the foot 434 not extended through the aperture 420 and the lower portion 416 defining the lower contact surface 418. In this first position of the foot 434, the input device 400 can be considered to be in a first condition where the frictional forces or sliding resistance of the input device 400 is determined by the interaction between the lower contact surface 418 as defined by the lower portion 416 and a support surface on which the input device 400 rests. In this first condition, the lower portion 416 can define a first coefficient of friction with the support surface.

Figure 4C:
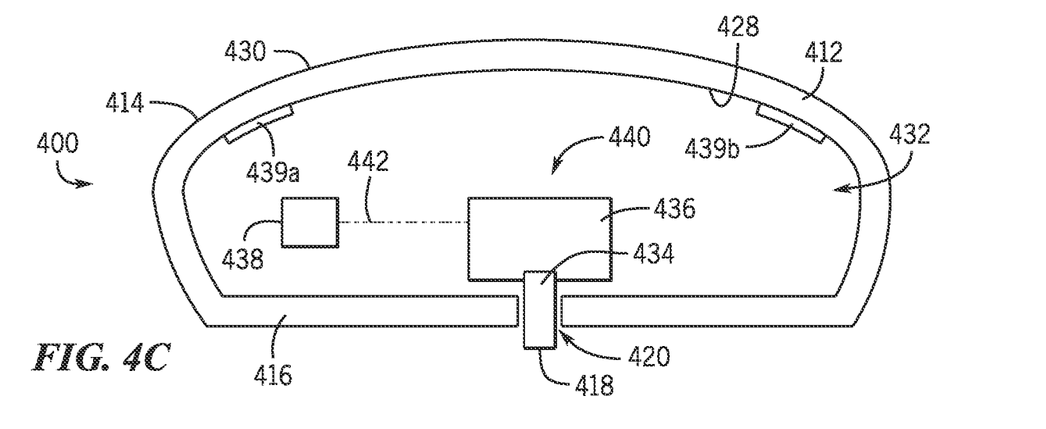
FIG. 4C shows a cross-sectional view thereof.
Figure 4D:
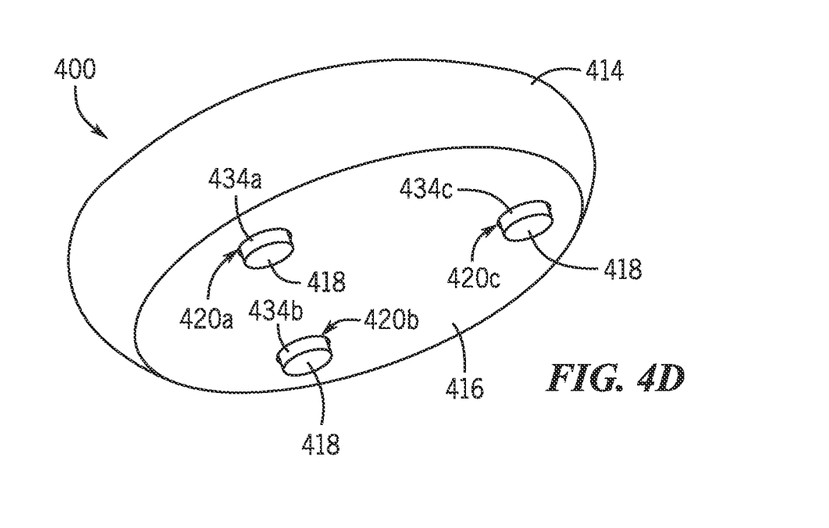
FIG. 4D shows a bottom, perspective view thereof.

FIG. 4C and FIG. 4D illustrate the input device 400 in a second condition where the foot 434 has been extended or moved through the aperture 420 by the actuator 436. In the second condition, a lower portion or surface of the foot 434 defines a lower contact surface 418 such that the frictional and sliding resistance forces, as well as the coefficient of friction between the input device 400 and a support surface, arise by the interaction between the foot 434, or multiple feet 434a, 434b, and 434c extending through respective apertures 420a, 420b, and 420c. In the second condition, with the foot 434 or multiple feet 434a-c extended through the apertures 420 in a second position, the frictional forces, frictional torques, coefficient of friction, or sliding resistance of the input device 400 sliding across support surface, can be different than the frictional forces and sliding resistance of the input device 400 in the first condition. This is because, in the second condition or second position of the feet 434 shown in FIGS. 4C and 4D, the contact surface 418 is at least partially, and in some cases entirely, defined by the feet 434. Thus, in the second condition of the input device 400, the interaction between the feet 434 and the support surface determines the coefficient of friction and sliding resistance of the input device 400 on the support surface.

In this way, in at least one example, a first coefficient of friction between the lower portion 416 and a support surface on which the input device 400 rests in the first position is different than a second coefficient of friction between the foot/feet 434 and the support surface in the second position where the feet 434 define the lower contact surface 418. In one example, the first coefficient of friction is greater than the second coefficient of friction. In one example, the second coefficient of friction is greater than the first coefficient of friction. In any case, the feet 434 can be selectively movable and extendable through the aperture 420 to alter the coefficient of friction defined by the input device 400 resting or sliding on a support surface.

There are many factors that affect the coefficient of friction defined by two materials or surfaces interacting with one another, either statically or kinetically. Normal forces between the surfaces or materials, material types, surface textures, total surface area, humidity, and many other factors can affect the coefficient of friction and ultimately the sliding resistance between the input device 400 and a support surface. The lower contact surface 418 as defined by the lower portion 416 in the first condition with the feet 434 and a first position as shown in FIGS. 4A and 4B can include one set of properties or factors influencing the first coefficient of friction while the lower contact surface 418 as defined by the lower surfaces of the feet 434 in the second position extending through the apertures 420 in the second condition can include another set of properties or factors influencing the second coefficient of friction. In general, however, reference to coefficient of friction is used herein generally refers to magnitude of frictional forces or sliding resistance experienced by the user as the user pushes on and/or slides the input device 400 across a support surface.

Examples of input devices described herein, including in the device 400 shown in FIGS. 4A-D illustrate three feet 434a-c selectively extendable through three respective apertures 420a-c. However, this configuration is used for exemplary and illustrative purposes only and is not meant to be limiting. In one or more other examples of devices described herein, less than three or more than three feet 434 and apertures 420 can be included based on the design needs and desired frictional changes of the input device 400. In addition, each foot 434 of a plurality of feet of any one input device can be individually actuated and extended through the aperture independently of other feet. In such an example, a single foot on one side of the device 400 can extend more or less than others to tilt, steer, apply a torque, or otherwise urge the mouse in a direction based on a difference in frictional sliding forces from one side of the device 400 to the other. In one example, all the feet of a single input device can be actuated together in unison. Also, the size, shape, and other design aspects of the feet 434 can be different in one or more other examples.

In at least one example, the actuator 436 of the device 400 can push or extend the feet 434 with variable force. In this way, when the user's hand rests on the device 400, the input device 400 can maintain contact with a support surface. If the force extending the feet 434 is less than an opposite force from the user's hand on the device 400, the variable force from the actuator 434 can result in a force from one or more of the feet 434 variably increasing or decreasing a sliding resistance of the device 400 along a spectrum. In such an example, the device 400 is not limited to only two discrete sliding resistances or frictional forces on a support surface. Thus, while a first position and second position of the feet 434 are illustrated and described herein, these positions and resulting frictional forces are not meant as limiting. Rather, these positions are shown for purposes of explanation while the feet 434 can include any position between the first and second positions shown and be acted on by the actuator 436 with variable force to provide variable sliding forces felt by the user.

Signals can be sent by a computing device and received by the input device 400 to actuate one or more feet 434 in order to change the frictional forces of the input device 400 on a support surface. These changes can correlate to a movement of a visual object on the display screen of the competing device as controlled by the input device 400. In this way, the sliding resistance of the input device 400 can be altered to various degrees and over time to create varied sliding resistances tactilely perceived by the user. This perceived tactile feedback of the varied friction, based on the positions of the feet 434 of the input device 400, can mimic a visual representation of unique and different surface textures and features displayed on a display screen of the competing device as the user visually drags an object, such as a cursor, across those textures and features.

Any of the features, components, and/or parts, including the arrangements and configurations thereof shown in FIGS. 4A-4D, can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 4A-4D.

Figure 5:
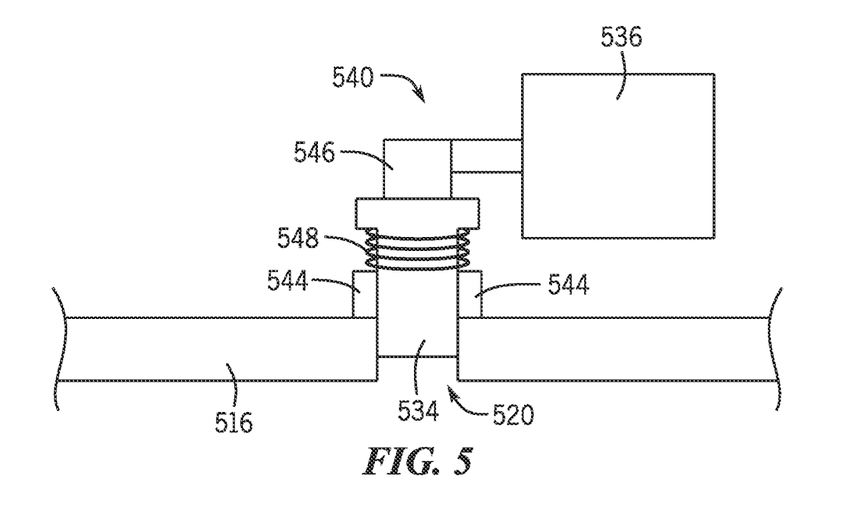
FIG. 5 shows an example of a haptic assembly of an input device.

FIG. 5 illustrates an example of a haptic assembly including an actuator 536 coupled to a foot 534. The actuator 536 can be a motor engaged with a top portion or surface of the foot 534 via a cam 546. The lower portion 516 of an input device can define an aperture 520 through which the actuator 536 can selectively extend the foot 534. The haptic assembly 540 can also include a bracket 544 to guide a linear translation of the foot 534 through the aperture 520 and a biasing element 548, such as a coil spring or other biasing mechanism, can maintain contact between the foot 534 and the cam 546. As the cam 546 rotates due to the shaft rotation provided by the actuator 536, a vertical position of the foot 534 can vary and the foot 534 can be extended in and out of the aperture 520.

One or more other examples can include haptic assemblies utilizing other actuation components and methods. In one or more examples, a haptic assembly can include magnetically actuated feet. One or more examples can include solenoids, various types of motors including stepper motors, brushless DC motors, brushed DC motors, AC motors, gears and gearboxes, and so forth.

Any of the features, components, and/or parts, including the arrangements and configurations thereof shown in FIG. 5, can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 5.

Figure 6:
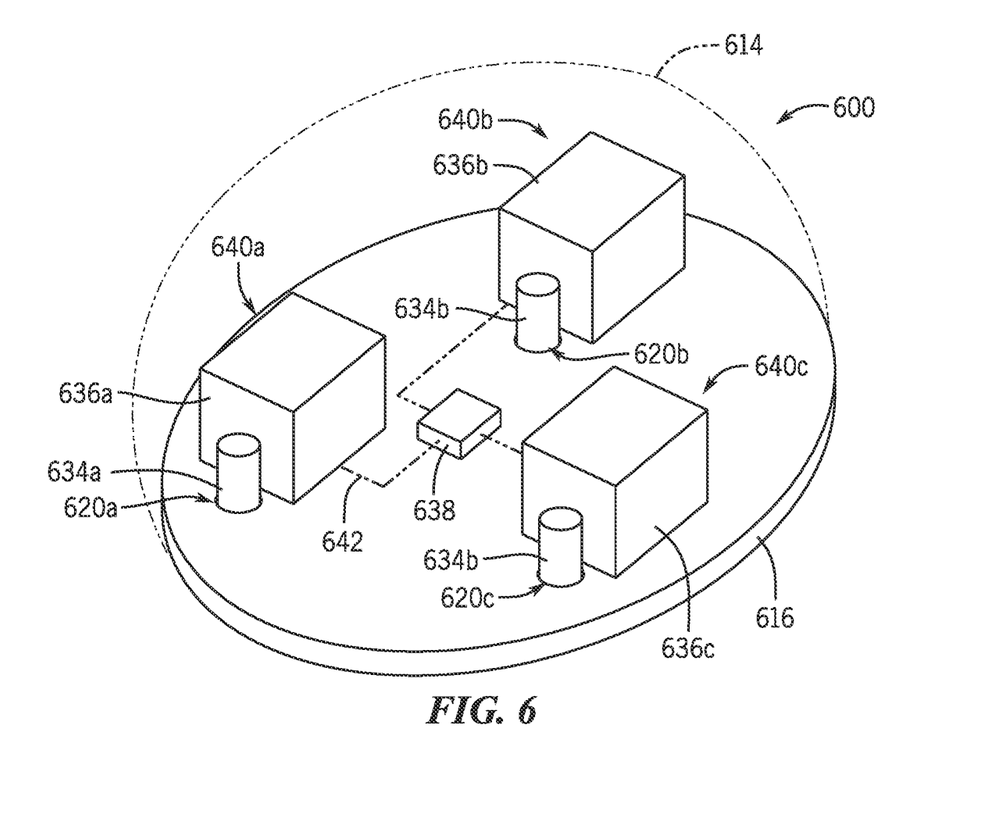
FIG. 6 shows a top, perspective view of an example of an input device with a portion of the housing removed to illustrate internal components.

FIG. 6 illustrates a perspective view of an example of an input device 600 including a grip portion 614 illustrated in dotted lines indicating transparency so as to illustrate various components within the input device 600. In the illustrated example, three separate haptic assemblies 640a, 640b, and 640c are disposed within the input device 600. The various haptic assemblies 640a, 640b, and 640c can be collectively referred to as haptic assemblies 640. Each haptic assembly 640 can include respective actuators 636a-c and feet 634a-c aligned with and selectively extendable through respective apertures 620a-c defined by the lower portion 616 of the input device 600.

A processor 638 can be disposed within the input device 600 and electrically coupled with each haptic assembly 640a-c via one or more wires or other circuitry 642 illustrated in dotted lines. The size, number, and position of each haptic assembly 640a-c can vary in one or more other examples. The illustrated example of FIG. 6 illustrates 3 haptic assemblies 640a-c selectively extending three feet 634a-c through three respective apertures 620a-c to vary the frictional properties of the input device 600 against a support surface.

As noted above with reference to other examples, the processor 638 can cause the one or more actuators 636a-c to extend the haptic feet 634a-c through the apertures 620a-c based on a location of a cursor controlled by the input device 600 on a display screen of a computing device.

Any of the features, components, and/or parts, including the arrangements and configurations thereof shown in FIG. 6 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 6.

Figure 7:
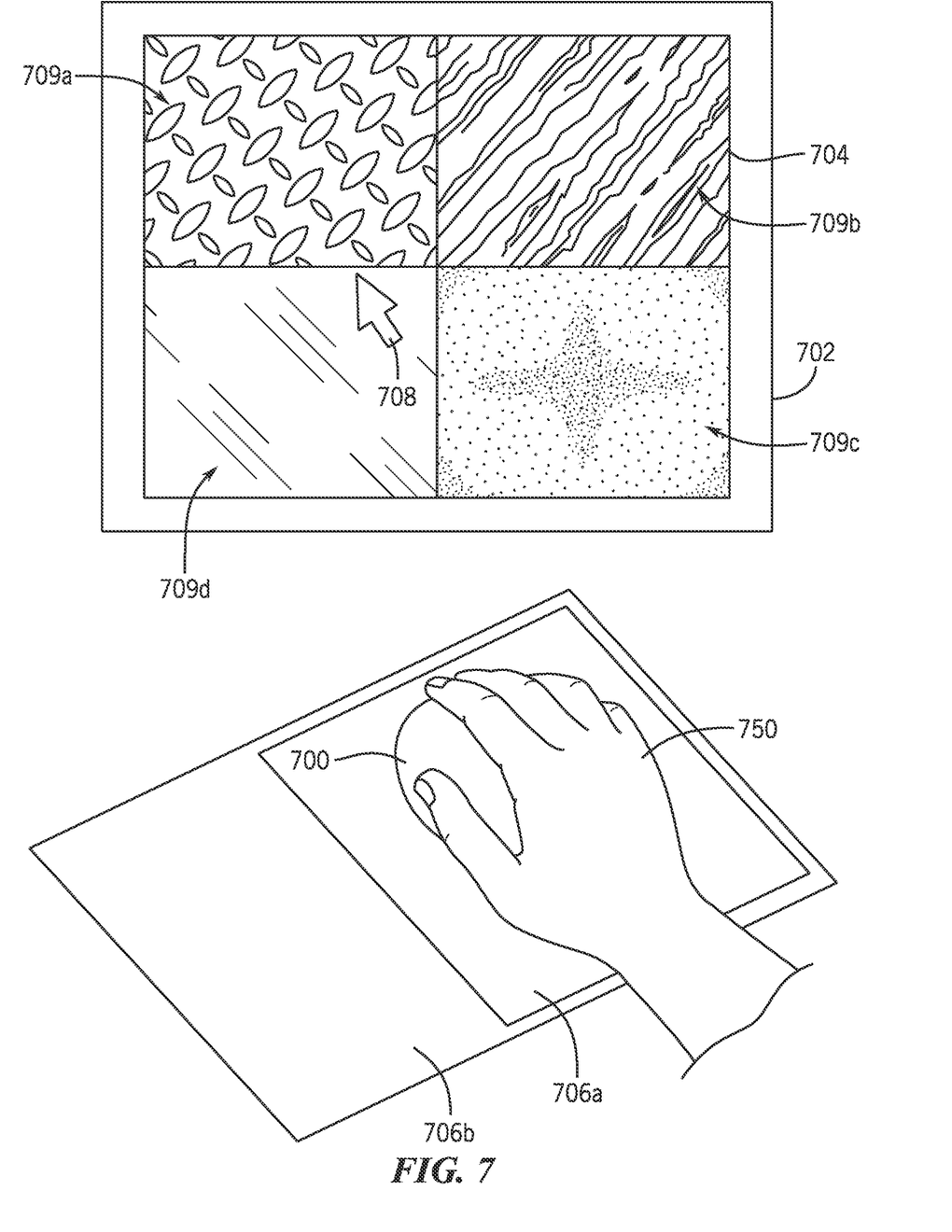
FIG. 7 shows an example of an input device controlling a visual object on a display screen.

FIG. 7 illustrates an example of an input device 700 being manipulated by a user's hand 750 on a support surface that includes a first support surface 706a and a second support surface 706b. The input device 700 can be referred to as a mouse or a computer mouse which is configured to manipulate a visual object, such as a cursor 708, across a display screen 704 of a computing device. FIG. 7 also shows a computing device, also referred to as a display device 702, including a display screen 704. As illustrated in FIG. 7, the display screen 704 can visually present separate surfaces, surface textures, or physical features in various regions or positions on the display screen 704. In the illustrated display screen 704 of FIG. 7, four distinct display regions 709a, 709b, 709c, and 709d of the display screen 704 each visually represent objects having different surface textures, materials, and other features.

For example, the first display region 709a visually depicts "diamond plate" sheet metal material, and the second display region 709b depicts wood material. The third display region 709c of the display screen 704 depicts a gradient of varying frictional forces, with dark regions representing higher frictional forces and lighter regions representing lower frictional forces or sliding resistances. As the user manipulates the input device 700 to control the position of the cursor 708 across the display screen 704, such as third display region 709c, the user can receive tactile feedback from the input device 700 due to the input device 700 altering its sliding resistance relative to the first support surface 706a, as described elsewhere herein. The sliding resistance on the first support surface 706a can be altered based on and corresponding to the position of the cursor 708 relative to the dark and light regions of greater and lesser friction, respectively, represented in the third display region 709c. The fourth display region 709d illustrates a glass surface.

In some embodiments, as the user manipulates the input device 700 with his or her hand 750 across the one or more support surfaces 706a and 706b, the cursor 708 or other graphical interface object or indicator displayed on the display screen 704 can correspondingly move across the display screen 704. As the cursor 708 moves across the different display regions 709a-d, the input device 700 is configured to vary frictional conditions and positions of the feet of the input device 700, as described herein, to physically mimic and haptically simulate different surface textures, features, and frictional conditions illustrated on the display screen 704. For example, as the user moves the cursor 708 on the display screen 704 over the diamond plate sheet metal image displayed in the first display region 709a, the input device 700 can extend and retract the feet to correspond to the diamond protrusion, thus physically producing the tactile sensation of the diamond protrusions to the user's hands 750. The input device 700 can also create the physical sensation of dragging a mouse over a wood surface, including reference to the portions of the wood grain, as displayed at the second display region 709b when the cursor 708 is manipulated over that region.

While specific surface features and textures are shown on the display screen 704 depicted in FIG. 7, one will appreciate that these are used for exemplary and illustrative purposes only. One or more other examples of input devices and display screens can produce and mimic any number of surfaces, textures, features, or other scenarios where physical conditions are visually represented on the display screen 704 and the user tactilely feels those scenarios as simulated through adjustment of the foot or feet of the input device. For example, these scenarios can include adjusting the horizontal movement of the input device 700 to be easier or more difficult for the user depending on a game condition (e.g., the virtual status or virtual position of a game character, such as being more difficult when the character is injured, wading through water, or wearing heavy equipment as compared to when the character is healthy or unburdened).

Within the third display region 709c, as the user manipulates the cursor 708 over the frictional gradient displayed on the display screen 704, the input device 700 can mimic these frictional gradients even if the frictional characteristics of the first support surface 706a are consistent otherwise (i.e., the first support surface 706a has a consistent texture, material, smoothness, etc. where the input device 700 moves). In some embodiments, as the user moves the input device over multiple support surfaces (e.g., 706b and 706a) to move the cursor 708 on the display screen 704 across the fourth display region 709d, the input device 700 can adjust the sliding resistance between the device 700 and each surface 706a, 706b so that the user feels like he or she is moving the input device 700 over a consistent piece of glass, which is virtually displayed in region 709d. Thus, even though the user physically moves the input device 700 across two surfaces 706a, 706b that would otherwise have different frictional feel and sliding resistance characteristics for a non-adjustable input device, the input device 700 can dynamically adjust sliding resistance of the device 700 as it moves from one surface to the other, thereby reducing or eliminating a difference in sliding resistance or texture feel experienced by the user as he or she slides the device 700.

In addition, in at least one example, the user can slide the device 700 across different support surfaces, which may have different frictional interactions with the input device 700, but the input device 700 is configured to alter a lower surface thereof such that the sliding resistance or frictional forces between the input device 700 and the support surface remains constant as perceived by the user. This can be done irrespective of the status of a cursor 708 or a graphic (e.g., any of 709a-d) being shown on the display 702. In one example, the first support surface 706a can include an upper surface of a mouse pad. The second support surface 706b can include a slicker surface having a lower coefficient of friction with the lower portion or feet of the input device 700 compared to a coefficient of friction between the first support surface 706a and the input device 700.

In such a scenario, when the user slides the input device 700 with his or her hand 750 from the first support surface 706a to the second support surface 706b, rather than feeling a difference in the sliding resistance or frictional forces between the input device 700 and various support surfaces 706a and 706b, the input device 700 can be configured to switch from a first condition to a second condition that increases the frictional coefficient between the input device 700 and the second support surface 706b. For example, the total contacting surface area between the input device 700 and the support surface can be dynamically adjusted. In this way, as the user moves the input device 700 across both support surfaces 706a and 706b, the coefficient of friction between the input device 700 and both support surfaces 706a and 706b can remain constant. This constant sliding resistance tactilely perceived by the user or the user's hands 750 can create a pleasing and consistent user experience with the input device despite moving across inconsistent support areas.

Any of the features, components, and/or parts, including the arrangements and configurations thereof shown in FIG. 7 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 7.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An input device, comprising:
   a housing defining an internal volume and a lower portion, the lower portion defining an aperture;
   a sensor disposed in the internal volume and configured to detect movement or position of the housing relative to a support surface; and
   a haptic assembly disposed in the internal volume, the haptic assembly comprising:
   an actuator; and
   a foot coupled to the actuator and aligned with the aperture, wherein the foot is configured to extend from the aperture in response to operation of the actuator while the sensor is detecting movement or position of the housing relative to the support surface.

2. The input device of claim 1, wherein:
   a plurality of capacitive sensing elements is disposed on the housing; and
   the foot is movable, via the actuator, between a first position and a second position, wherein in the second position, the foot extends through the aperture.

3. The input device of claim 2, wherein a first coefficient of friction between the lower portion and the support surface on which the input device rests with the foot in the first position is different than a second coefficient of friction between the foot and the support surface with the foot in the second position.

4. The input device of claim 1, wherein the actuator is operable to selectively extend the foot through the aperture.

5. The input device of claim 1, wherein the lower portion comprises a support protrusion having a lower surface.

6. The input device of claim 1, wherein the lower portion defines a lower surface configured to support the input device on the support surface.

7. The input device of claim 6, wherein the actuator is configured to extend the foot through the aperture such that a contact surface of the foot supports the input device on the support surface.

8. The input device of claim 7, wherein a frictional force between the input device and the support surface on which the input device rests changes when the contact surface of the foot supports the input device.

9. A mouse, comprising:
   a housing being circular about a central axis and defining:
   an aperture; and
   a lower surface; and
   a foot movable between a first position and a second position;

a touch sensor; and an electrical coupling between the touch sensor and a processor, wherein:

with the foot in the first position, the lower surface defines a bottom-most surface of the mouse;

with the foot in the second position, the foot extends through the aperture and defines a bottom-most surface of the mouse; and the processor is configured to determine an intended orientation of the housing based on a hand position of a user detected by the touch sensor while the foot is in the second position.

10. The mouse of claim 9, wherein the bottom-most surface is configured to contact a support surface on which the mouse rests while the foot is in the first position or while the foot is in the second position.

11. The mouse of claim 9, further comprising an actuator coupled to the foot, the actuator configured to selectively extend the foot through the aperture.

12. The mouse of claim 11, wherein a sliding resistance between the lower surface and a support surface on which the mouse rests changes based on whether the foot is in the first position or the foot is in the second position.

13. The mouse of claim 9, wherein:

the foot is a first foot;

the aperture is a first aperture;

the housing defines a second aperture; and the mouse comprises a second foot extendable through the second aperture.

14. An input device, comprising:

a first condition having a first sliding resistance on a surface;

a second condition having a second sliding resistance on the surface, the second sliding resistance being different than the first sliding resistance;

an actuator to selectively switch the input device from the first condition to the second condition; and an input sensor to detect input from a hand of a user grasping the input device;

wherein the actuator is configured to selectively switch between the first condition and the second condition according to a texture pattern, the texture pattern being dependent on the position of the input device relative to a support surface.

15. The input device of claim 14, wherein the actuator is a motorized actuator operable to extend a foot relative to a bottom surface of the input device.

16. The input device of claim 14, wherein:

in the first condition, the input device includes a lower portion defining a first lower contact surface and an aperture; and in the second condition, the input device includes a foot extending through the aperture and defining a second lower contact surface separate from the first lower contact surface.

17. The input device of claim 16, wherein the actuator selectively switches the input device from the first condition to the second condition by extending the foot through the aperture.

18. The input device of claim 17, further comprising a processor programmed to control the actuator to extend the foot through the aperture based on a location of a cursor controlled by the input device on a display screen.

* * * * *